3,168,571
KETONE PURIFICATION WITH BISULFITE WASHED ION EXCHANGE RESINS
Chauncey R. Hare, Berkeley, Calif., assignor to California Research Corporation, San Francisco, Calif., a corporation of Delaware
No Drawing. Filed Jan. 4, 1962, Ser. No. 164,396
4 Claims. (Cl. 260—593)

This invention relates to a method of purifying ketones. More particularly, this invention relates to the use of ion exchange resins for the purification of ketones.

Numerous patents have issued for the preparation of ketones by the autoxidation of aralkyls and the subsequent decomposition of the hydroperoxides. A variety of methods for decomposing the hydroperoxides have also been reported, viz., U.S. Patent Nos. 2,671,809, 2,889,368, and 2,904,592. The ketones obtained by this method, while of high purity, often have trace impurities. The amount of impurities present is related to the permanganate time, that is, the length of time in which a permanganate solution is decolorized. In U.S. Patent No. 2,904,592, the acetone obtained is indicated as having a permanganate time of at least 4 hours.

For many uses, e.g., solvents, it is essential that the ketones be free of trace contaminants. Since long periods of standing or repeated transfers of the ketone from one container to another significantly reduce the permanganate time, it is necessary that at the time of manufacture, the ketone have a much longer permanganate time than is required at the time of ultimate use.

It has now been found that the permanganate time of the ketones is greatly enhanced, indicating the reduction in the presence of trace impurities, by treating the ketone with strongly basic anion exchange resins, i.e., those that have quaternary ammonium cations.

The resins may have a polystyrene backbone cross-linked with divinyl benzene. A quaternary ammonium salt such as trimethyl benzyl ammonium, dimethyl benzyl ethanol ammonium, etc. will then usually be bonded to the polymer by a carbon-carbon bond. Examples of resins are Dowex 1, 11 and 21K made by Dow Chemical Company and Rohm and Haas Amberlite IRA 400. (See Dowex: Ion Exchange, Lakeside Press, Chicago, Illinois, (1959) for a fuller description of the Dowex resins.)

In carrying out the process, the resin is treated with bisulfite, washed with deionized-distilled water and is then ready to be used to purify the ketone. The resin may be mixed with the ketone in a batchwise method or more efficiently be utilized in a continuous manner by packing a column with the resin and then flowing the ketone through the column.

In preparing the resin, the resin is usually immersed in a dilute aqueous bisulfite solution, usually from about 2 to 15% bisulfite, allowed to stand for a short time while immersed, the bisulfite solution is then removed, and the resin is washed thoroughly with deionized-distilled water.

In the continuous method, flowrates may be varied widely; liquid space velocities of about 0.05 to 500 v./v./hr. have been found practicable. Aliquots of the ketone are tested until the permanganate time drops below the desired value. The resin is then reactivated with bisulfite in the previously described manner.

Since trace amounts of metals, particularly iron, tend to reduce the permanganate time, vessels used in the purification should be of inert materials, such as glass, ceramic, stainless steel, resin coated, etc.

Any lower alkyl ketone may be used in this process, i.e., acetone, butanone, etc., when prepared by the decomposition of an aralkyl hydroperoxide. Because acetone is made commercially by the decomposition of cumyl hydroperoxide, this new method of purification may be used most advantageously for the purification of large quantities of acetone. It has been found, however, that with acetone which has a permanganate time of less than two hours, this method of purification is relatively ineffective.

By way of illustration, the following examples are presented. However, it must be remembered that these examples are included merely to further describe the process and product of this invention and are not to be construed as putting additional limitations upon the scope thereof.

EXAMPLE I

To 25 ml. of Amberlite IRA 400 in a 100 ml. burette was added 100 ml. of 5% aqueous sodium bisulfite and allowed to stand for about 15 minutes. The sodium bisulfite solution was drained off and the resin was washed with 1000 ml. of deionized-distilled water.

The burette was then filled with acetone having a permanganate time of 7 hours, while the stopcock was adjusted to a flowrate of 26 ml./hr. (104 v./v./hr.). One hundred ml. of acetone was allowed to pass over the resin before the next 100 ml. was take n for analysis. The permanganate time was 18 hours. A 100 ml. sample taken after the next 500 ml. had been treated, had a permanganate time of 14 hours.

EXAMPLE II

The column was prepared as described in Example I. The acetone used had a permanganate time of 10 hours, and was passed through the column at a flowrate of 10.5 ml./min. (25 v./v./hr.). The following table indicates the degree of purification:

*Table I*

| Sample No. | Amount of Acetone Treated Before Analysis (ml.) | Permanganate Time (hrs.) |
|---|---|---|
| 1 | 200 | 32 |
| 2 | 575 | 22 |
| 3 | 1,400 | 19 |

EXAMPLE III

Dowex 21K, an example of a quaternary ammonium ion exchange resin, was used in place of the Amberlite IRA 400 as the resin. Using the procedure of Example I, and a flowrate of 4.2 ml./min. (10 v./v./hr.), acetone which had a permanganate time of 13 hours was improved to a permanganate time of 26 hours.

EXAMPLE IV

Dowex 3, a weak base ion exchange resin having amino groups for activity, was used in place of Amberlite IRA 400. Using the procedure of Example I, and a flowrate of 1.1 ml./min. (2.5 v./v./hr.), acetone having a permanganate time of 6 hours was obtained from acetone which previously had a permanganate time of 9 hours.

The use of a weakly basic resin treated with sodium bisulfite failed to remove trace impurities from the acetone.

Chemical methods of treatment were also tried. Using 30% aqueous hydrogen peroxide, 0.025 weight percent, in acetone for 1 hour at 25° C. gave a product having a permanganate time of less than one minute. A saturated aqueous solution of sodium dichromate, 0.074 weight percent, in acetone for 1 hour at 25° C. reduced permanganate time from 10 hours to 7.5 hours. Dry calcium hypochlorite, 0.088 weight percent, in the same acetone for 1 hour at 25° C. gave a product having a permanganate time of less than 30 minutes. Treatments with mixtures of potassium permanganate and sodium hydroxide or sodium hypochlorite and sodium hydroxide had no effect on permanganate time.

The permanganate time is described in ASTM D 1363 and is determined by the addition of 2 ml. of 0.02 weight percent potassium permanganate solution to 50 ml. of acetone and recording the time until the acetone becomes colorless. The ASTM specification for acetone is 2 hours permanganate time.

As will be evident to those skilled in the art, various modifications on this process can be made or followed, in the light of the foregoing disclosure and discussion, without departing from the spirit or scope of the disclosure or from the scope of the following claims.

I claim:

1. A method for purifying lower alkyl ketones which have been prepared by the decomposition of ar(lower alkyl) hydroperoxides, which comprises contacting said ketones with a strongly basic ion exchange resin having bisulfite anions adsorbed thereon.

2. A method according to claim 1 wherein the ketone is acetone.

3. A method for purifying lower alkyl ketones which have been prepared by the decomposition of ar(lower alkyl) hydroperoxides, which comprises contacting said ketones with an aqueous sodium bisulfite washed strongly basic ion exchange resin.

4. A method according to claim 3, wherein said basic ion exchange resin is a quaternary ammonium type resin.

References Cited in the file of this patent
UNITED STATES PATENTS
2,624,699  Joris ----------------- Jan. 6, 1953